Patented Nov. 24, 1925.

1,562,544

UNITED STATES PATENT OFFICE.

CHARLES L. CUNNINGHAM, OF BALTIMORE, MARYLAND.

INK.

No Drawing.   Application filed August 14, 1924.   Serial No. 731,962.

*To all whom it may concern:*

Be it known that I, CHARLES L. CUNNINGHAM, a citizen of the United States, residing at Baltimore city, in the State of Maryland, have invented certain new and useful Improvements in Inks, of which the following is a specification.

This invention relates to inks, and especially to an ink for penetrating coating of shellac and other materials.

One object of the invention is to provide an improved ink that will penetrate and merge with coatings of shellac, varnish, paint and the like, so as to be proof against erasion, or withstand the tendencies of being worn or rubbed off by its oft-repeated contact with adjacent objects or materials, and which also withstands the action of acids, alkalis and other chemicals which remove the ordinary surface-inks. Another object is to provide an ink of this character that softens the dry or set coating at the point or points where it is applied on such coating, and quickly allows such coating to re-harden with a smooth glossy finish which shows very clearly the words or characters printed thereon with such ink.

In putting the invention into practice, I preferably use the following ingredients in the proportions here given, or approximately such proportions, as follows:

By weight, two parts absolute alcohol, one part diethyl phthalate, seventeen parts ethyl lactate or ethyl oxalate, and any suitable coloring matter in the desired quantity to produce the color and shade desired. Although the foregoing proportions obtain the best results yet arrived at, I do not limit the invention to such proportions, nor to the use of all the ingredients here named, for fairly good results are obtained when the alcohol is omitted. Instead of the ethyl lactate or ethyl oxalate, I may employ any other material which is suitable and serves as a solvent for softening and penetrating the hardened coating of lacquer or other similar coating on wood, metal or other material, or I may employ both the ethyl lactate and ethyl oxalate.

One method of mixing the ingredients is as follows: Dissolve the desired amount of coloring matter in the alcohol, then mix with the other ingredients. If the alcohol is omitted, the coloring matter may be dissolved in the diethyl phthalate, but the main purpose of the last named ingredient is to keep the stamp-pad moist for a long period; so this ingredient may be omitted when alcohol is used, especially when the ink is not intended for use in stamping. Such ink may be used with pen or brush instead of a stamp, or may be used on a printing press.

The material resulting from the foregoing combination of ingredients, also constitutes a dye or stain for lacquered surfaces and the like, and, as either an ink or a dye, its combination with such waterproof coatings as lacquer, varnish and oil-mixed or lead-mixed paints, and its application to such coatings after they have hardened, and its penetration of and merged relation with such hardened coatings, are claimed as features of this invention.

What I claim as my invention is:—

1. A penetrative ink which includes alcohol, an ethyl ester of a kind that acts as a solvent for softening and penetrating a hardened non-hydroscopic coating, and suitable coloring matter.

2. A penetrative ink which includes an ethyl ester of a kind that acts as a solvent for softening and penetrating a hardened non-hydroscopic coating, an evaporation-retarding solvent, and suitable coloring matter.

3. A penetrative ink which includes an ethyl ester of a kind that acts as a solvent for softening and penetrating a hardened non-hydroscopic coating, diethyl phthalate, and suitable coloring matter.

4. A penetrative ink which includes alcohol, an ethyl ester of a kind that acts as a solvent for softening and penetrating a hardened non-hydroscopic coating, an evaporation-retarding solvent, and suitable coloring matter.

5. A penetrative ink which includes alcohol, an ethyl ester of a kind that acts as a solvent for softening and penetrating a hardened non-hydroscopic coating, diethyl phthalate, and suitable coloring matter.

6. A penetrative ink which includes alcohol, ethyl lactate, and coloring matter.

7. A penetrative ink which includes alcohol, ethyl lactate, an evaporation-retarding solvent, and suitable coloring matter.

8. The combination of a varnished or similarly coated body, and a penetrative ink substantially such as defined in claim 1, this ink being applied on such coated body and penetrating the coating thereof.

9. The combination of a body, a non-hydroscopic coating thereon, and a penetrative ink substantially such as defined in claim 2, this ink being on and penetrating the surface of said coating.

10. A penetrative ink which includes the following ingredients in the approximate, proportions named as follows: by weight, one part diethyl phthalate, seventeen parts ethyl lactate, two parts absolute alcohol, and any suitable kind and quantity of coloring matter, to produce the penetration of lacquered or similarly coated surfaces, substantially as specified.

In testimony whereof I affix my signature.

CHARLES L. CUNNINGHAM.